United States Patent [19]

Willingham et al.

[11] Patent Number: 4,936,168
[45] Date of Patent: Jun. 26, 1990

[54] TIRE PLUG INSERTION TOOL

[75] Inventors: Thomas K. Willingham; Robert F. Wegehaupt, both of Nashville, Tenn.

[73] Assignee: Perfect Equipment Corporation, Lavergne, Tenn.

[21] Appl. No.: 468,275

[22] Filed: Jan. 22, 1990

[51] Int. Cl.$^5$ .............................................. B60C 25/16
[52] U.S. Cl. .................................................... 81/15.7
[58] Field of Search ........................ 81/15.2, 15.5, 15.7

[56] References Cited

U.S. PATENT DOCUMENTS 3,122,951  3/1964  Berg ...................................... 81/15.7
4,548,102  10/1985  DiRocco ............................... 81/15.7

Primary Examiner—Roscoe V. Parker
Attorney, Agent, or Firm—Harrington A. Lackey

[57] ABSTRACT

A tool for inserting an elongated repair plug into an injury hole of a tire wall, especially from the interior of the tire, including a barrel having a receiving chamber and a nozzle projecting from the discharge end of the barrel, and a ram member having a plunger axially receivable within the receiving chamber for forcing a repair plug through the barrel and the nozzle when the nozzle is inserted through the injury hole. The rear end of the barrel and the ram member are provided with interlocking members for holding the ram member against rotational movement about the longitudinal axis of the barrel in a locking position in order to permit the nozzle, not only to be inserted axially through the injury hole, but also to be simultaneously rotated with the ram member.

7 Claims, 2 Drawing Sheets

TIRE PLUG INSERTION TOOL

BACKGROUND OF THE INVENTION

This invention relates to a tire plug insertion tool, and more particularly to a tire plug insertion tool in which the ram member and barrel may be held in a locked position during the insertion procedure.

Tire insertion tools of various types are well known in the art. Most such insertion tools include a barrel having a receiving chamber for the insert plug and a nozzle including a smaller diameter compression chamber for receiving and compressing the plug as it is forced through the nozzle in the injury hole of the tire wall, so that when the tool is removed from the hole, the elastic plug remains in the hole and expands when released to fill the hole.

One example of such a tool is the PNEU-LOCK RADIAL TIRE REPAIR KIT NO. 249 manufactured by Tuffy Manufacturing Industries of Akron, Ohio, which is adapted to be connected to the air chuck of a conventional compressed air tire hose in order to apply the force to the plunger for insertion of the plug into the injury hole. This tool is also disclosed in the U.S. Borg Pat. No. 3,122,951, issued Mar. 3, 1964.

Another example of a prior insertion tool is the "PATCH 'PLUG-IT' KIT" NO. 14-538 manufactured by "31" Incorporated of Newcomerstown, Ohio. This tool is adapted to be manually operated by pushing a large diameter handle on the end of a plunger moving the plunger down through the receiving chamber to force the insert plug through the compression chamber of the nozzle into the injury hole.

The No. 241 and 241P "JIFFY GUN" of Perfect Equipment Corp. of Lavergne, Tenn., utilizes a pistol-type gun including a trigger operated lever mechanism for applying force to the plunger in order to force the insert plug through the barrel and the nozzle into the injury hole.

One tire plug insertion tool adapted to be used on the interior of the tire wall is disclosed in the DiRocco et al U.S. Pat. No. 4,548,102, issued Oct. 22, 1985. The DiRocco tool is somewhat similar to the prior tool utilized in the above "PATCH 'PLUG-IT' KIT", but DiRocco utilizes a plug having a tapered front end portion.

In FIG. 1 of DiRocco et al, the ram or plunger is removed from the barrel. The barrel which is provided with transverse aligned holes for receiving a turning bar 38 in order to assist in rotating the tool as it is manually forced through the injury hole of the tire wall. Moreover, DiRocco et al utilizes a hex-shaped barrel in order to facilitate gripping the barrel in order to twist or turn the tool for insertion of the tool through the injury hole.

SUMMARY OF THE INVENTION

It is therefore an object of this invention to provide a tire plug insertion tool incorporating a hollow barrel and a cooperating ram member having a handle member, in which the handle member and the receiving end of the barrel are provided with detachable cooperating locking members to facilitate turning and twisting of the tool as the nozzle is being inserted through the injury hole.

It is another object of this invention to provide a plug insertion tool including a barrel and a nozzle cooperating with a ram member in which the receiving end of the barrel is provided with notches for selectively receiving radial locking lugs on the ram member, which may be quickly engaged in a locking position when the ram member is fully inserted in the barrel and which may be rapidly disengaged by retracting the ram member.

A further object of this invention is to provide a tire plug insertion tool incorporating a barrel and a nozzle cooperating with a ram member in which radially extending finger grips project from the exterior surface of the barrel at a spaced distance from the handle member of the ram member to facilitate, not only gripping the tool for insertion, but also rotating the nozzle through the injury hole of the tire wall.

DESCRIPTION OF THE PREFERRED EMBODIMENTS

Figure 1:
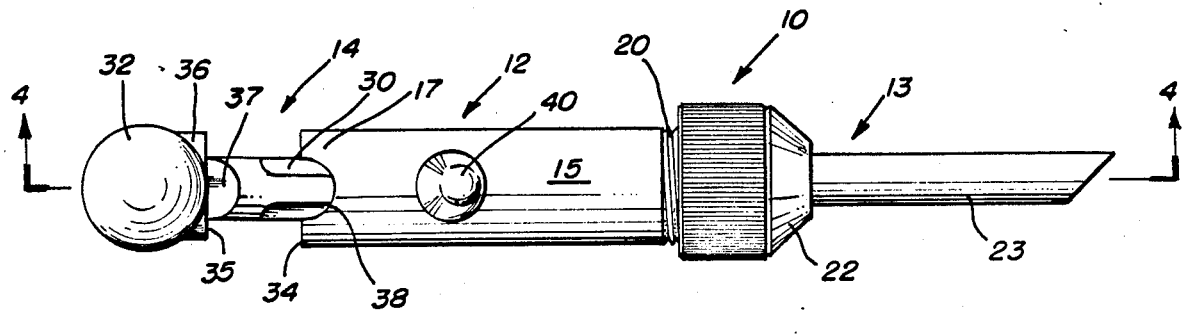
FIG. 1 is a side elevational view of the preferred embodiment of the tire plug insertion tool made in accordance with this invention, with the ram member slightly withdrawn in an unlocked position.

Referring now to the drawings in more detail, FIGS. 1-5 disclose a preferred form of the insertion tool 10 made in accordance with this invention, including an elongated hollow barrel 12, a nozzle 13, and a ram member 14.

The barrel 12 has a substantially cylindrical outer wall or surface 15, a front or discharge open end portion 16 and a rear or receiver end portion 17. Within the barrel 12 is an elongated substantially cylindrical receiving chamber 18 communicating with a tapered reducing chamber 19 in the discharge end portion 16.

In the embodiment of the insertion tool 10 disclosed in FIGS. 1-5, the nozzle 13 is separably connected to the barrel 12 by threads. External threads 20 are formed on the outer surface 15 of the discharge open end portion 16 of the barrel 12 for threaded engagement with the internal threads 21 of the cup-shaped connector 22 of the nozzle 13.

Projecting longitudinally axially from the connector 22 is an elongated hollow stem 23 having an elongated cylindrical compression chamber 24 of substantially the same diameter as the reduced open end of the tapered reducing chamber 19. The compression chamber 24 is of lesser diameter than the diameter of a cylindrical tire repair plug 25. The tire repair plug 25 is preferably made of an elastic or resilient material, such as uncured or partially cured rubber in a manner well known in the art.

Figure 4:
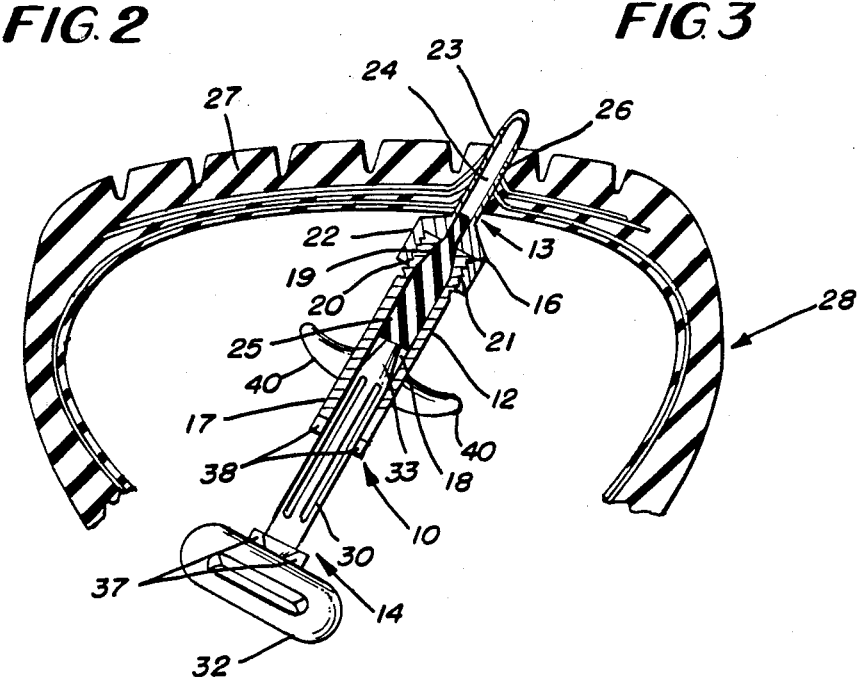
FIG. 4 is a reduced sectional view taken along the line 4—4 of FIG. 1, illustrating the nozzle inserted through an injury hole in the tread wall of a tire shown fragmentarily and in section, with the ram member rotated 90 deg. from its position in FIG. 1 and forcing the plug into the compression chamber of the nozzle.

The diameter of the receiving chamber 18 may be approximately the same as, or slightly larger than, the diameter of the uncompressed repair plug 25, as best disclosed in FIG. 4. Furthermore, in a manner well known to the art, the receiving chamber 18 is slightly longer than the length of the repair plug 25.

Figure 5:
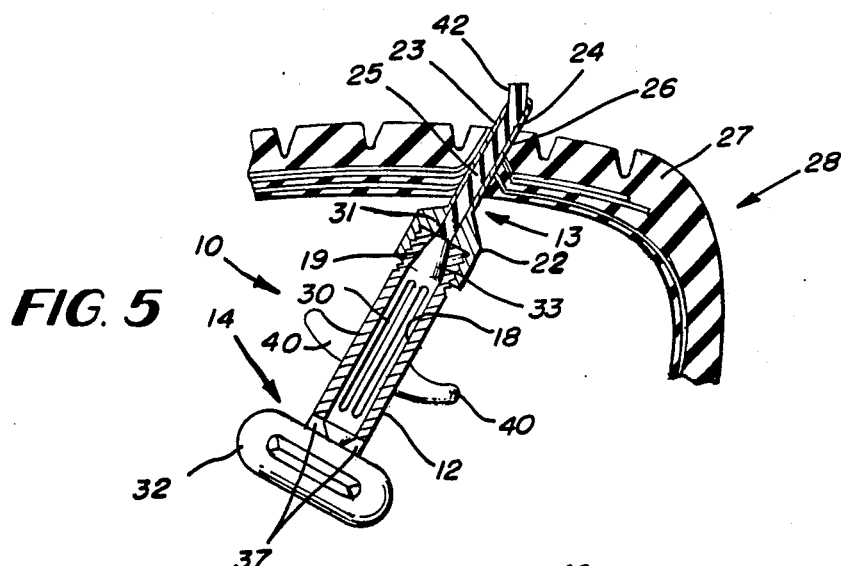
FIG. 5 is a sectional elevation similar to FIG. 4 illustrating the ram member fully inserted and locked within the barrel of the tool and with the tip portion of the plug extruded from the open end of the nozzle.
Figure 6:
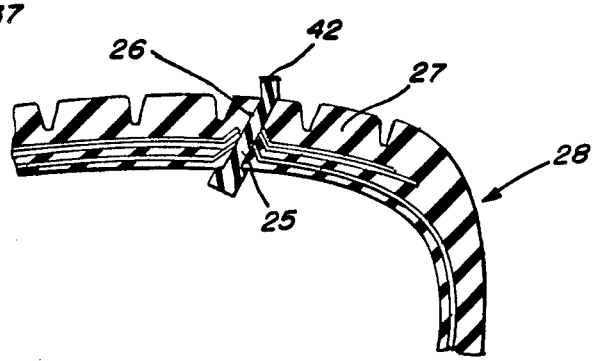
FIG. 6 is a view similar to FIG. 5, after the tool has been completely removed, leaving the plug fully inserted through the injury hole.

As best disclosed in FIG. 5, the length of the cylindrical plug 25 is greater than the length of the compression chamber 24. Thus when the plug 25 is extruded by the ram member 14 entirely through the length of the compression chamber 24 the remote end portion or tip 42 of the plug 25 will project beyond the free end of the nozzle stem 23.

The length of the nozzle stem 23 is greater than the depth of the injury hole 26 through the wall, such as the tread 27, of the tire 28, as best disclosed in FIGS. 4 and 5.

The ram member 14 includes an elongated substantially cylindrical plunger 30, the free end portion of which may be tapered if desired, and which terminates in a ram face 31. The opposite end of the plunger 30 terminates in a transverse handle member 32 which extends laterally beyond the outer periphery of the plunger 30. The tapered free end portion 33 of the plunger 30 is designed to project into the tapered reducing chamber 19, as desired, as disclosed in FIG. 5.

In a preferred form of the invention, the rear end portion 17 of the barrel 12 terminates in a substantially planar rear rim 34 which is adapted to abut flush against the planar ledge surface 35 of the shoulder 36 forwardly projecting from the handle member 32 toward the plunger.

Also projecting forward from the planar surface 35 of the shoulder 36 are a pair of diametrically opposed locking lugs 37 on opposite sides of the plunger 30. As disclosed in the drawings, and particularly FIGS. 1, 2, 3, and 5, the lugs 37 are arcuate in cross-section and extend laterally of the handle end portion of the plunger 30 and preferably substantially coaxially, diametrically opposed to each other.

Adapted to receive the arcuate lugs 37 in a locking or latching engagement are a pair of diametrically opposed, transversely coaxial, arcuate notches 38 formed in the planar rear rim 34 of the barrel 12.

Figures 2, 3:
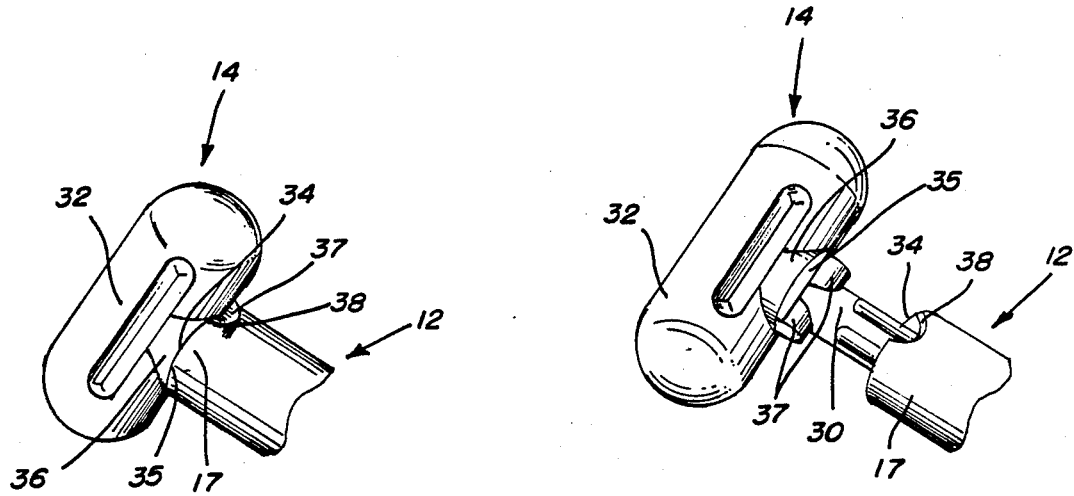
FIG. 2 is an enlarged fragmentary perspective view of the rear end portion of the tool illustrating the ram member and barrel in a locked position.
FIG. 3 is a view similar to FIG. 2 with the ram member slightly withdrawn and rotated 90 deg. from the position of FIG. 2, in an unlocked position.

As best disclosed in FIGS. 1-3, by removing the ram member 14 slightly from the rear end 34 of the barrel 12, the ram member 14 is free to rotate about its own longitudinal axis relative to the barrel 12. However, when the ram member 14 is moved forwardly into the barrel 12, the forward movement is arrested by the engagement of the locking lugs 37 against the planar rim 34. However, by rotating the handle member 32 until the locking lugs 37 are in registry with the locking notches 34, the ram member 14 may again be moved forwardly until the locking lugs 37 are firmly seated and locked against the rotation within their corresponding locking notches 38. In this forward locking position, rotation of the ram member 14 causes the simultaneous rotation of the barrel 15 and the nozzle 13. Thus, by turning the handle member 32 about its own longitudinal rotational axis, the barrel 12 and the nozzle 13 may be rotated so that the stem 23 is turned or twisted within the injury hole 26 to facilitate axial movement of the stem 23 through the hole 26 until the remote end of the stem 23 projects from the opposite side of the tire wall, such as the tread 27, as best disclosed in FIGS. 4 and 5.

It will be understood that other types of interlocking mechanisms might be utilized instead of the locking lugs 37 and the locking notches 38, such as other types of interdigitating interlocking devices. For example, there could be a plurality of smaller locking lugs 37 and a corresponding number of locking notches 38 having the same circumferential spacing as the locking lugs 37.

In order to facilitate the manipulation of the insertion tool 10, and particularly the turning or twisting of the handle member 32 and the barrel 12, a pair of diametrically opposed finger grip members 40 project from the opposite side surfaces 15 of the barrel 12 so that when the ram member 14 is fully inserted and locked in the barrel 12, and the handle member 32 is fitted in the heel of the operator's hand, the forefinger and middle finger of the operator's hand may comfortably encircle or grip the finger grip members 40.

In the operation of the insertion tool 10, a nozzle 13 is threadedly secured to the front end portion of the barrel 12. The plunger 30 is then inserted through the open rear end of the receiving chamber 18 until the tapered end portion 33 is seated in the tapered reducing chamber 19, and the handle member 32 is rotated until the locking lugs 37 register with the notches 38. The handle member 32 is then thrust slightly forward until the locking lugs 37 are seated in the locking notches 38. The operator then grasps the handle member 32 in the heel of his hand and grips the finger grip members with his forefinger and middle finger and holds the ram member 14 tightly in place and in locked position relative to the barrel 12. The stem 23 is then inserted, preferably from the interior of the tire 28 outwardly through the injury hole 26. If difficulty is experienced in penetrating the hole 26, the entire insertion tool 10 is rotated as a unit, by virtue of the interlocking lugs 37 and notches 38.

After the stem 23 penetrates the hole 26 so that its free end projects beyond the exterior surface of the tire wall, such as the tread 27, as best illustrated in FIG. 4, the ram member 14 is removed from the barrel 12. A cylindrical rubber repair plug 25 is then inserted into the rear end of the receiving chamber 18 and the plunger 30 reinserted into the receiving chamber 18. The handle 32 is then forced forwardly to force the plug member 25 down through the reducing chamber 19 and into the compression chamber 24 of the stem 25. Continued pressure of the plunger 30 forward into the receiving chamber 18 extrudes the plug member 25 through the compression chamber 24 until its remote end projects beyond the remote end of the stem 23, as best disclosed in FIG. 5. When the free end of the plug 25 projects beyond the stem 23, it expands and creates an enlarged tip 42 which resists withdrawal through the injury hole 26 when the tool 10 is withdrawn. In the withdrawal phase, the handle member 32 will remain locked with the barrel 12 by virtue of the interlocking lugs 37 and recesses or notches 38, so that the stem 23 may be rotated as well as withdrawn axially in order to facilitate its removal from the injury hole 26. because of the enlarged tip 42, the expanded plug member 25 resists any withdrawal through the injury hole 26 as the stem 23 is withdrawn from the injury hole 26.

Figure 7:
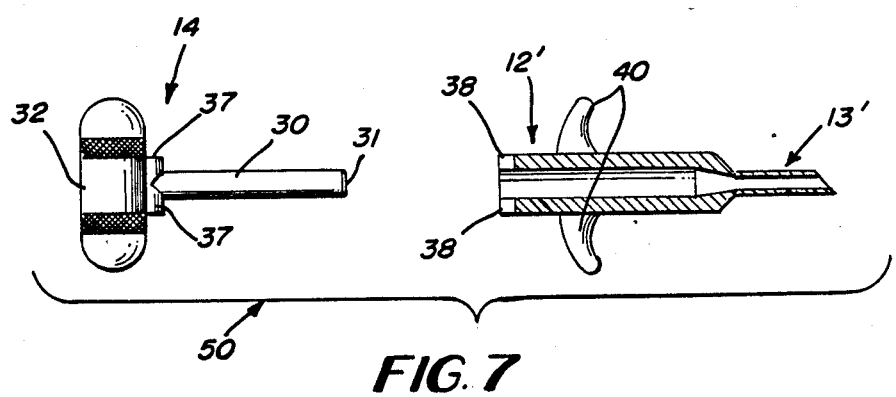
FIG. 7 an exploded view of a slightly modified tool, with the barrel and integral nozzle disclosed in section, and with the ram member fully removed from the barrel.

FIG. 7 discloses a modified insertion tool 50 incorporating a barrel 12' which is integrally formed with the nozzle 13'. The ram member 14 may be identical to the ram member 14 in the tool 10, but is shown in FIG. 7 without the tapered end portion 33 of the plunger 30.

The modified insertion tool 50 includes the same interlocking lugs 37 and interlocking notches 38 as the insertion tool 10.

Figure 8:
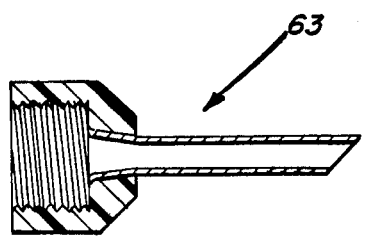
FIG. 8 is an enlarged sectional elevation of a nozzle of smaller size to be used with the barrel disclosed in FIGS. 1-5.

FIG. 8 merely discloses a nozzle 63 of smaller size than the nozzle 13 to be used with a smaller size plug. The nozzles 63 and 13 may be interchangable.

It will therefore be seen that insertion tools 10 and 50 have been designed in which the same tool may be utilized for reaming the injury hole 26 through the tire wall 28 and for inserting the plug member 25 through the injury hole, without utilizing any additional tools. Such an operation is made possible by the interlocking mechanism between the ram member 14 and the barrel 12, and particularly the interlocking lugs 37 and notches 38.

It is also within the scope of this invention to provide interlocking lugs, such as locking lugs 37 to project rearwardly from the rear rim 34 of the barrel 12 and to provide locking notches, similar to locking notches 38, on the handle member for cooperation with the locking lugs.

What is claimed is:

1. A tool for inserting an elongated cylindrical repair plug of elastic material into a hole extending through a tire wall having an interior surface and an exterior surface, comprising:
   (a) an elongated hollow barrel having a longitudinal axis, an exterior surface, an open discharge end portion, and an opposite open receiver end portion, and a receiving chamber between said open end portions, for receiving a repair plug,
   (b) an elongated nozzle fixed to said discharge end portion of said hollow barrel for extruding the repair plug from said receiving chamber,
   (c) a ram member comprising an elongated substantially cylindrical plunger telescopingly receivable within said receiving chamber and terminating in a handle member, said handle member extending radially beyond said exterior surface of said barrel,
   (d) first locking means on said receiver end portion of said barrel, and
   (e) second locking means on said handle member adapted to cooperate with said first locking means to lock said handle member against rotational movement relative to said barrel about said longitudinal axis.

2. The invention according to claim 1 in which said first locking means and said second locking means comprise interdigitating lock members.

3. The invention according to claim 2 in which said interdigitating lock members are circumferentially spaced about said longitudinal axis.

4. The invention according to claim 2 in which an interdigitating lock member of said first locking means comprises a locking notch in said receiver end portion of said barrel opening away from said barrel, and an interdigitating lock member in said second locking means comprising a locking lug adapted to be received in said locking notch in a locked position.

5. The invention according to claim 4 in which said receiver end portion of said barrel comprises a seat, said locking notch being formed in said seat, said locking lug projecting radially from said plunger adjacent said handle member whereby when said plunger is rotated to said locking position, said locking lug registers with said locking notch.

6. The invention according to claim 5 further comprising a pair of said locking notches circumferentially spaced on said seat, and further comprising a pair of said locking lugs circumferentially spaced around said plunger for simultaneous engagement with said corresponding locking notches in said locking position, said locking lugs being adapted to engage said seat in an unlocked position.

7. The invention according to claim 1 further comprising a pair of finger grip members projecting radially in opposite directions from said exterior surface of said barrel and spaced from said handle member in a locked position to permit a pair of fingers of an operator of said tool to grip said finger grip members while holding said handle member.

* * * * *